United States Patent [19]

England

[11] 4,184,574
[45] Jan. 22, 1980

[54] INTERNAL SHOE DRUM BRAKES

[75] Inventor: Michael J. England, West Midlands, England

[73] Assignee: Girling Limited, Birmingham, England

[21] Appl. No.: 909,472

[22] Filed: May 25, 1978

[30] Foreign Application Priority Data

May 25, 1977 [GB] United Kingdom ............... 21958/77

[51] Int. Cl.² ............................................ F16D 65/08
[52] U.S. Cl. .................................. 188/341; 188/206 A
[58] Field of Search ...................... 188/78, 206 A, 217, 188/327–330, 333, 334, 337, 341, 79.5 S, 79.5 SC

[56] References Cited

U.S. PATENT DOCUMENTS

| | | | |
|---|---|---|---|
| 1,851,737 | 3/1932 | Stoner | 188/341 X |
| 1,989,208 | 1/1935 | McConkey | 188/79.5 SC |
| 2,326,177 | 8/1943 | Schnell | 188/341 X |
| 2,710,076 | 6/1955 | Russell | 188/341 X |
| 2,718,284 | 9/1955 | Anderson | 188/206 A |

Primary Examiner—Duane A. Reger
Attorney, Agent, or Firm—Scrivener, Parker, Scrivener & Clarke

[57] ABSTRACT

In an internal shoe-drum brake a thrust transmitting member is interposed between a shoe-end and an abutment for that shoe-end. The thrust transmitting member has a planar face engaging with the abutment and an arcuate face which is received in a complementary recess of arcuate outline in the shoe-end.

7 Claims, 4 Drawing Figures

INTERNAL SHOE DRUM BRAKES

SPECIFIC DESCRIPTION

This invention relates to internal shoe-drum brakes for vehicles of the kind in which arcuate shoes carrying friction linings are adapted to be urged into engagement with a rotatable drum.

In known shoe-drum brakes of the kind set forth the shoe-ends abut directly against an actuating abutment member or a drag-taking abutment. Usually the shoe ends are of curved or arcuate outline to provide a line or substantially "point" contact with the abutments. This results in high contact stresses being set up when the brake is applied which, in turn, dictates the type of material from which the abutment can be constructed. In addition, the operation of the brake is affected by friction between the shoes and the abutments and, under certain conditions, experienced particularly with heavily laden commercial vehicles, this can result in lower output and poor wear pattern being produced.

According to our invention, in a shoe-drum brake of the kind set forth a thrust transmitting member is interposed between a shoe-end and an abutment, the thrust transmitting member having a planar face engaging with the abutment and an arcuate face which is received in a complementary recess of arcuate outline in the shoe-end.

In operation the shoe can rock about the arcuate face, and the planar face, which slides on the abutment, reduces the stresses by distributing the loads over a substantial bearing area. This enables us to construct the abutment from a material of a lower strength and quality than might otherwise be necessary in brakes in which the shoe-end engages directly with the abutment.

When the shoe has a single radial web, the recess is provided in the web to receive the arcuate face on the thrust transmitting member. When used in such a construction the thrust transmitting member is of "U" outline comprising spaced radial flanges on opposite sides of a thrust transmitting portion. The web is received between the flanges and the thrust transmitting member is housed within a radial slot in the abutment to restrain the member and, in consequence, the shoe-end against movement in an axial direction, and the base of the slot defines an abutment surface against which the member bears slidably.

Preferably the thrust transmitting member is interposed between the non-actuated shoe-end and the drag-taking abutment. Conveniently, however, the shoe is symmetrically arranged and a thrust transmitting member is interposed between each end of each shoe and a respective abutment.

One embodiment of our invention is illustrated in the accompanying drawings in which.

Figure 1:
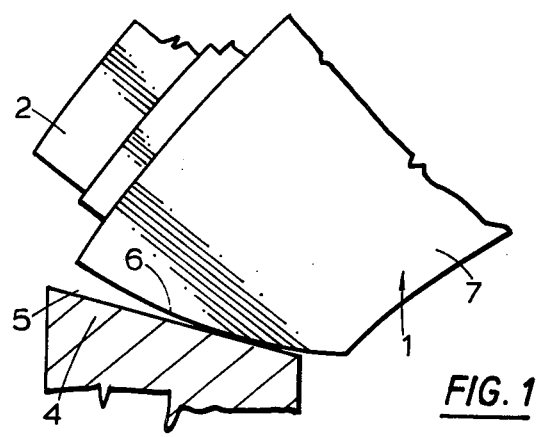
FIG. 1 shows a conventional engagement between a shoe-end and an abutment in an internal shoe-drum brake.

In the internal shoe-drum brakes illustrated in the drawings a pair of arcuate shoes carrying friction linings 2 for engagement with a rotatable drum are mounted on a stationary back-plate. Only one of the shoes 1 is illustrated. Each shoe is actuated on one end by an actuating abutment 3 for example a tappet, of an actuator to apply it to the drum, and the opposite end of each shoe engages with a drag-taking abutment 4. In a brake of the two-leading shoe type, the drag-taking abutment 4 for one shoe comprises one end of the actuator for the other shoe.

In the known brake illustrated in FIG. 1 of the drawings, the drag-taking abutment 4 has a planar radial face 5 with which an arcuate face 6 at the shoe-end engages. When the shoe has a single central web 7, the arcuate face 6 is provided on the free end of the web 7. There is therefore substantially a "point" contact between the web 7 and the face 5.

Figure 3:
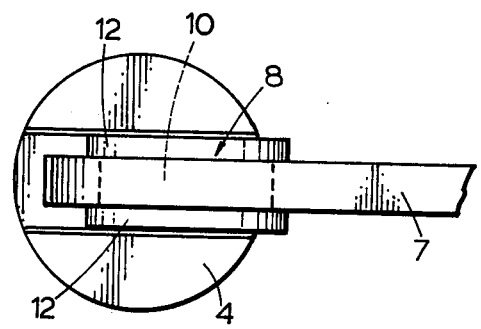
FIG. 3 is a plan of the engagement shown in FIG. 2.
Figure 4:
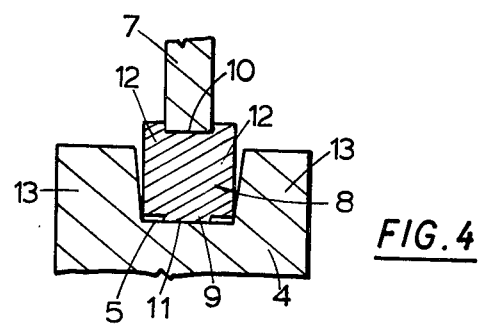
FIG. 4 is an end view of the same.
Figure 2:
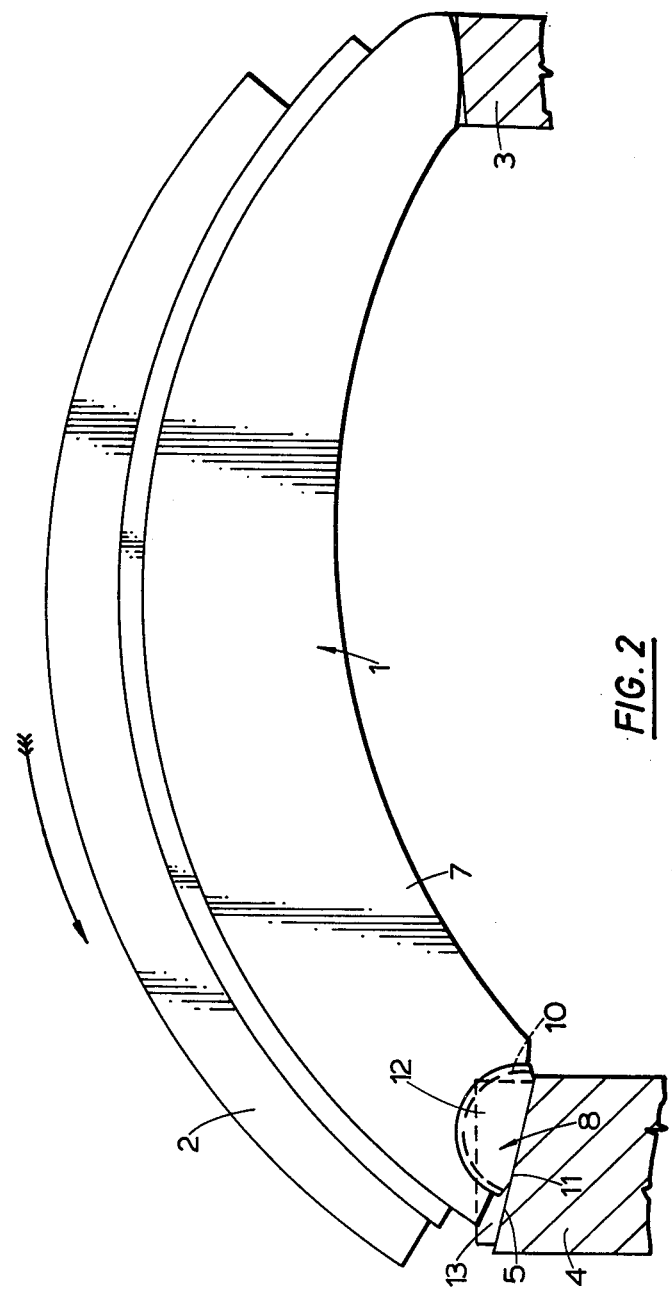
FIG. 2 shows an engagement between a shoe-end and an abutment in accordance with our invention.

In the brake illustrated in FIGS. 2 to 4 of the drawings, a thrust transmitting member 8 of "U" outline is interposed between the free end of the web 7 and the planar abutment face 5. The member 8 comprises a slipper of channel section outline having a central thrust transmitting portion 9 of part-circular outline which is received in a complementary recess 10 in the web 7 and which has an opposite planar face 11 engaging slidably with the abutment face 5. The portion 9 is located between a pair of spaced side flanges 12 between which the web 7 is received and the side flanges, in turn, are received between the walls 13 of a slot in the abutment member 4 of which the base defines the abutment face 5. Thus the shoe 1 is located against movement in an axial direction away from the back-plate by the walls 13.

In operation the shoe 1 can rock about the part-circular thrust transmitting portion 9 due to the engagement of the wall of the recess 10 with it, and the thrust transmitting member 8 can slide on the surface 5 to which the load on the shoe is transmitted over a substantial area.

I claim:

1. An internal shoe-drum brake for vehicles comprising arcuate shoes carrying friction linings for engagement with a rotatable drum, each shoe having an actuated shoe-end abutment and a non-actuated shoe-end abutment, actuating means acting on said actuated shoe-end abutments to urge said shoes into engagement with said drum, said actuating member incorporating an actuating abutment, drag-taking abutments with which said non-actuated shoe-ends co-operate, and a separate thrust transmitting member separate from said shoes, said actuating means, and said drag-taking abutments and interposed between at least one of said shoe-end abutments of at least one of said shoes and a corresponding one of the other of said abutments which together constitute a corresponding pair, said thrust transmitting member having a planar face engaging slidably with one of said abutments of said pair and an arcuate face, and the other of said abutments has a complementary recess of arcuate outline in which said arcuate face is received for relative arcuate movement.

2. A shoe-drum brake as claimed in claim 1, wherein said one shoe has a single radial web, and said recess is provided in said web to receive said arcuate face on said thrust transmitting member.

3. A shoe-drum brake as claimed in claim 2, wherein said thrust transmitting member is of "U" outline comprising a thrust transmitting portion and spaced flanges on opposite sides of said thrust transmitting portion, and said web is received between said flanges, the said one abutment having a radial slot in which said thrust transmitting member is housed to restrain the member and, in consequence, the said one shoe-end against movement in an axial direction, said slot having a base defining an abutment surface against which said member bears slidably.

4. A shoe-drum brake as claimed in claim 1, wherein said thrust transmitting member is interposed between said non-actuated shoe-end abutment and said drag-taking abutment.

5. A shoe-drum brake as claimed in claim 4, wherein a thrust transmitting member is interposed between each said non-actuated end abutment of each said shoe and a respective one of said drag-taking abutments.

6. A shoe-drum brake as claimed in claim 4, wherein a thrust transmitting member is interposed between each end abutment of each said shoe and a respective one of said abutments of a corresponding pair.

7. A shoe-drum brake as claimed in claim 1, wherein the said one of said shoe-end abutments incorporates said recess in which said arcuate face is received.

* * * * *